(12) United States Patent
Mäder

(10) Patent No.: US 10,011,430 B2
(45) Date of Patent: Jul. 3, 2018

(54) CONVEYING DEVICE WITH A CONVEYING CHAIN

(71) Applicant: WRH Walter Reist Holding AG, Ermatingen (CH)

(72) Inventor: Carl Conrad Mäder, Hittnau (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 15/446,154

(22) Filed: Mar. 1, 2017

(65) Prior Publication Data

US 2017/0253433 A1    Sep. 7, 2017

(30) Foreign Application Priority Data

Mar. 4, 2016    (CH) ...................................... 0278/16

(51) Int. Cl.
*B65G 17/12* (2006.01)
*B65G 17/32* (2006.01)

(52) U.S. Cl.
CPC ........... *B65G 17/12* (2013.01); *B65G 17/326* (2013.01); *B65G 2201/0235* (2013.01)

(58) Field of Classification Search
CPC .... B65G 17/326; B65G 17/12; B65G 17/005; B65G 17/14
USPC .... 198/470.1, 867.05, 867.02, 867.06, 803.7
See application file for complete search history.

(56) References Cited

U.S. PATENT DOCUMENTS

| | | | |
|---|---|---|---|
| 3,339,701 A * | 9/1967 | Weichhand ............ | B65G 17/12 198/449 |
| 3,394,636 A * | 7/1968 | Vadas ..................... | B31B 50/00 198/803.7 |
| 3,587,829 A | 6/1971 | Sorenson | |
| 3,805,947 A * | 4/1974 | Ward ...................... | B65G 17/12 198/803.14 |
| 4,112,837 A * | 9/1978 | Altman .................... | A23N 3/00 198/803.7 |
| 4,716,714 A | 1/1988 | Tisma | |
| 4,740,284 A | 4/1988 | Bolte et al. | |
| 5,429,226 A * | 7/1995 | Ensch .................... | B65G 17/44 198/803.14 |
| 5,657,858 A | 8/1997 | Van Den Goor | |

(Continued)

FOREIGN PATENT DOCUMENTS

| | | |
|---|---|---|
| DE | 1178011 | 9/1964 |
| DE | 10 2004 004 898 | 8/2005 |

(Continued)

OTHER PUBLICATIONS

Switzerland Search Report dated May 12, 2016, Application No. 00278/16.

(Continued)

*Primary Examiner* — Mark A Deuble

(74) *Attorney, Agent, or Firm* — Rankin, Hill & Clark LLP

(57) ABSTRACT

A conveying device with a conveying chain, which includes a plurality of chain links, and a plurality of conveyed object containers, which are attached on the conveying chain, for receiving a conveyed object. The conveyed object containers are fastened to the conveying chain via holding elements connected to the conveying chain, wherein the conveyed object containers are held in each case by the holding element.

19 Claims, 5 Drawing Sheets

(56) References Cited

U.S. PATENT DOCUMENTS

| | | | |
|---|---|---|---|
| 6,772,876 B2 * | 8/2004 | Spangenberg | B65G 17/066 198/867.02 |
| 7,306,092 B1 | 12/2007 | Heinzl et al. | |
| 7,681,720 B2 * | 3/2010 | Monti | B65G 17/12 198/465.2 |
| 8,205,743 B2 | 6/2012 | Meinzinger et al. | |
| 9,027,740 B2 | 5/2015 | Boehrer | |
| 2007/0056828 A1 * | 3/2007 | Zemlin | B65G 17/12 198/397.01 |
| 2011/0277420 A1 | 11/2011 | Peters et al. | |
| 2013/0015108 A1 | 1/2013 | Krauss et al. | |
| 2015/0259145 A1 * | 9/2015 | Fenile | B65G 17/12 198/803.3 |

FOREIGN PATENT DOCUMENTS

| | | |
|---|---|---|
| DE | 10 2005 047 676 | 4/2007 |
| DE | 10 2008 020 117 | 10/2009 |
| DE | 20 2011 003 760 | 9/2011 |
| EP | 0 251 055 | 1/1988 |
| EP | 0 746 519 | 12/1996 |
| EP | 2 499 501 | 7/2013 |
| GB | 785220 | 10/1957 |
| GB | 958 764 | 5/1964 |
| JP | 3-243525 | 10/1991 |
| WO | 00/34156 | 6/2000 |

OTHER PUBLICATIONS

European Search Report dated Jul. 19, 2017, Application No. 17 15 8588, 18 pages.

* cited by examiner

CONVEYING DEVICE WITH A CONVEYING CHAIN

BACKGROUND OF THE INVENTION

Field of the Invention

The invention lies in the field of conveying technology and relates to a conveying device with a chain conveyor, which includes a conveying chain as well as a plurality of conveyed object containers that are attached on the conveying chain and are for receiving a conveyed object.

Description of Related Art

It is known to convey a conveyed object along a conveying path, in a manner lying on the conveying rest of chain conveyor. The conveyed object thereby often lies on the conveying rest in an unsecured manner. However, with such conveying devices, as a rule the conveyed object is conveyed in a conveying plane without descents or ascents.

As is known, such conveying devices offer little opportunity concerning the freedom of the design of the conveying paths. Accordingly, such conveying devices are not suitable for all fields of application.

Conveying devices, with which the conveyed object is conveyed in a conveying plane, indeed offer the advantage of the conveyed object not having to be secured by way of special measures, so as not to fall down. Simple lateral constraints or limitations on the conveying rest are often sufficient, and these prevent the conveyed object from slipping from the conveying surface due to braking or acceleration forces. Even slight ascents and descents can be dealt with quite well by way of such simple measures.

However, in certain situations, such as lack of space for example, it is desirable or even necessary to move out into the third dimension. The inclusion of the third dimension in particular permits crossing conveying paths, which significantly increases the design scope when planning the conveying paths.

Moreover, processing stations on different planes (levels) become possible due to the leading of the conveying paths in the third dimension.

Steep ascents and descents as well as curved paths in space however demand a reliable securing of the conveyed object. Thus, for example, gripper conveyors or clamp conveyors are known, and these hold the conveyed object with their gripper limbs or clamp limbs. Printed products are usually conveyed by way of gripper conveyors or clamp conveyors. Gripper conveyors or clamp conveyors, however, are not suitable for all types of conveyed object. This is the case with piece items (discrete goods or objects) that are conveyed individually or in groups, in piece item receivers of piece item containers.

SUMMARY OF THE INVENTION

It is therefore the object of the present invention, to suggest a conveying device that permits the conveying of piece item containers with piece items, in three-dimensional space. In particular, the conveying device should permit the conveying of the piece items along steep ascents and descents, as well as along curved paths in space. A conveying along a spiral-like curved path and in particular an upside-down conveying, for example, should moreover also be possible.

The invention is now characterised in that the conveyed object containers are fastened to the conveying chain in each case via a holding member, which is directly or indirectly connected to the conveying chain, wherein at least one conveyed object container is held by a holding member in each case. The conveyed object containers in particular are releasably held by the holding elements.

The holding member in particular includes holding means, such as holding elements, via which the conveyed object container is held on the holding element.

The holding can be a clamped, positive, frictional, which is to say non-positive, holding. Combinations of these are likewise possible. The holding can also be effected by way of magnetic force.

The holding elements can be designed in a complaint manner, for forming a clamping, positive and/or frictional, which is to say non-positive, holding.

The conveying chain comprises a plurality of chain links. The individual holding members can thereby be connected, in particular fastened, to one or more chain links in a direct or indirect manner in each case. It is also possible for the chain links to form part of the holding element.

In particular, the holding member in each case can be assigned to an individual chain link and be fastened to this. Thus, in each case one holding member can be provided per chain link.

However, one can also envisage an individual holding member being fastened to the conveying chain via several chain links.

Basically, a holding member does not need to be directly or indirectly attached to each chain link. Indeed, it is conceivable for one or more chain links to be arranged as spacer elements between two holding members of the chain conveyor, without a holding member being directly or indirectly fastened to these, and thus to form gaps between the holding elements.

In the conveying section, the conveying chain is arranged in particular below the holding member or below the insertion section of the holding member or of the receiving region of the insertion section.

According to the invention, the holding member receives at least one conveyed object container. The holding member can be designed for receiving exclusively one conveyed object container. The holding member can also be designed for receiving several conveyed object containers.

Thus, in each case the at least one conveyed object container, the holding member and, as the case may be, a chain link, in particular can form a conveying unit.

The at least one conveyed object container can be pushed onto the holding member, in particular along an insertion direction, for creating the holding. The holding member in particular is designed and arranged on the chain conveyor such that the insertion direction in particular has a lateral component with respect to the conveying direction. "Lateral" thereby means transversely to the conveying direction.

The insertion direction can also have a direction component in the conveying direction, with respect to the conveying direction.

However, the insertion direction can alternatively also have a direction component that is directed opposite to the conveying direction.

The insertion direction in particular encloses an angle of greater than 0° (angle degrees) with the conveying direction.

The insertion direction in particular encloses an angle of less than 90° (angle degrees) with the conveying direction.

The angle can be an acute angle. The acute angle for example is 10° to 80°, in particular 20° to 70°.

The angle can also be a right angle of 90°.

The insertion direction can also run parallel to the conveying direction, thus enclose an angle of 0°.

In particular, the holding member can be designed as a longitudinal body. The longitudinal axis of the longitudinal body in particular runs parallel to the insertion direction. This means that the conveyed object container is pushed onto the holding member in a manner parallel to the longitudinal direction of the holding element.

Accordingly, the holding member in particular can be arranged on the conveying chain, which is to say chain link, such that the longitudinal axis of the longitudinal body is aligned obliquely to the conveying direction. This means that the longitudinal axis is aligned at an angle of larger than 0° to the conveying direction, as described above.

The holding member, for example, can include a main body in the form of an angular profile.

The conveyed object container can be designed as a longitudinal body. The insertion direction in particular runs parallel to the longitudinal axis of the longitudinal body.

Accordingly, the conveyed object container in particular is arranged on the holding member such that the longitudinal axis of the longitudinal body is aligned obliquely to the conveying direction. This means that the longitudinal axis is aligned at an angle of greater than 0° to the conveying direction, as described above.

The holding members in particular are each releasably fastened to the chain conveyor, in particular to the conveying chain which is to say to the chain link. The releasable connection can be a positive and/or non-positive connection. The connection can be a clip connection, detent connection or snap connection.

For this, the holding members can each include a connecting body, via which the holding member is fastened to the chain conveyor, in particular to the conveying chain, which is to say to the chain link. The connecting body can be a releasable or non-releasable part of the holding element.

The holding member in particular includes clamping means that directly or indirectly exert a clamping force upon the conveyed object container. The conveyed object containers are clampingly held on the holding member in a direct or indirect manner by way of the clamping means.

The clamping means press the conveyed object container against a counter-element on the holding member, in particular in a direct or indirect manner, whilst forming a clamped holding.

The clamped holding is to prevent a release of the conveyed object container from the holding element.

To indirectly exert a clamping force onto the conveyed object container in particular means that the clamping means act upon the conveyed object conveyed with the conveyed object container.

To press the conveyed object container indirectly against a counter-element on the holding member in particular means that the conveyed object conveyed with the conveyed object container is pressed against the counter-element.

The conveyed object container or the unit of the conveyed object container and the conveyed object thus in particular is fixedly clamped between the clamping means and the counter-element.

The result of an indirect clamping of the conveyed object container is that the conveyed object conveyed with the conveyed object container is secured against a release from the holding member, just as the conveyed object container itself.

The counter-element can be a rigid element. In particular, the counter-element is designed as a stop. The counter-element, e.g., can be a stop bar.

It is possible for the holding member to include a counter-element for the conveyed object container as well as a counter-element for the conveyed object that is conveyed with the conveyed object container. By way of this, the conveyed object container, which is to say an empty conveyed object container, as well as the conveyed object conveyed by the conveyed object container is secured against a release from the holding element.

In particular, the holding member and the conveyed object container are designed such that the clamping means are biased (preloaded), in particular are biased by the conveyed object container, on inserting the conveyed object container onto the holding element.

The conveyed object containers and the conveyed object are secured against a release from the holding members, and specifically independently of the spatial position of the holding member along its conveying path, as well as independently of accelerating and braking forces which act upon the holding member or the conveyed object container, due to the clamped holding of the conveyed object container or of the unit of the conveyed object container and the conveyed object.

Accelerating and braking forces occur, for example, when the holding member is stopped or braked for the purpose of a take-over of a conveyed object container, and must be accelerated again subsequently to the take-over. Accelerating and braking forces also occur in the context of operational disruptions, with which the conveying of the conveyed object must be slowed down or interrupted.

This means that the conveyed object containers and with these, the conveyed object can be conveyed along arbitrarily running conveying paths in three-dimensional space. The conveying path can include, e.g., positive or negative gradients, curves as well as spiral-like courses. Even an upside-down is possible.

The conveying of the conveyed object is not restricted to an individual conveying plane on account of this. The design scope on planning conveying paths is also accordingly large.

In particular, the conveyed object containers are designed for conveying a conveyed object in the form of piece items (piece goods or individual items). The conveyed object containers can thereby be designed in each case for conveying an individual piece item or several piece items. Accordingly, the conveyed object container is a piece item container.

In particular, the piece item container can be designed for the grouped conveying of several piece items.

The piece items can, e.g., be blanks or semi-finished products or workpieces that are conveyed to the individual machining/processing stations by way of the conveying device. Such semi-finished products can be gas lighters for example.

The piece items can also be articles such as goods for consumption, which are order-picked in the piece item containers.

The clamping means in particular include a clamping element that directly or indirectly exerts a clamping force upon the conveyed object container. The conveyed object container is thereby pressed by the clamping element against the counter-element in a direct or indirect manner.

The clamping element can be an elastic, in particular a spring-elastic element, which directly or indirectly exerts a restoring force, in particular spring force, upon the conveyed object container. The restoring force thereby corresponds to the clamping force. The clamping element can include, for example, spring steel, in particular a spring steel sheet or consist of this.

The clamping element can be of spring steel or plastic.

According to a particular embodiment, the clamping element is an arched spring steel sheet. On inserting the conveyed object container onto the holding member, the conveyed object container is pushed over the arched spring steel sheet, whilst this flattens. The restoring force of the flattened spring steel sheet directly or indirectly presses the conveyed object container against the counter-element.

The clamping means however can also include a swing-clamp mechanism, by way of which the conveyed object container is directly or indirectly clampingly pressed onto the counter-element.

The clamping means in particular are designed such that the clamping force acting directly or indirectly upon the conveyed object container acts perpendicularly to the insertion direction of conveyed object container.

The counter-element can itself likewise be designed as clamping means, in particular as a clamping element. The counter-element can thus likewise be an elastic, in particular a spring-elastic element that directly or indirectly exerts a restoring force, in particular spring force, upon the conveyed object container. Consequently, the conveyed object container can also be fixedly clamped between two clamping elements.

The chain links each include connection interfaces, via which these are connected to one another, in particular in a releasable manner. In particular, the releasable connection is of a tool-free nature. The connection interfaces in particular can include coupling elements.

The connection between the chain links in particular is a joint connection.

The coupling elements can thus include pairings of joint head and joint socket.

In particular, the chain links each include at least one roller. In particular, the chain links each have at least two rollers.

In particular, the chain link is desired as a carriage. The carriage in particular is rail-guided. The rail can be runner rail.

The chain conveyor according to this further development, amongst other things can be formed by the conveying chain, the holding members, the piece item containers as well as by the runner rail.

The chain links, in particular the carriages, in particular each include a main body, to which the holding member is fastened. The holding member can be fastened to the chain link or the carriage in a direct manner, or indirectly, e.g. via a guard element described further below.

The connection interfaces are moreover arranged on the main body. Furthermore, the rollers are also fastened to the main body. The main body can consist of plastic, for example.

The conveyed object container is characterised by at least one conveyed object receiver, which forms a receiving space for receiving the conveyed object. The conveyed object container can form an individual conveyed object receiver or several conveyed object receivers.

In particular, the conveyed object container, and with it, the at least one conveyed object receiver is shape-stable, i.e. retains its shape. In particular, the conveyed object container is designed in a rigid, which is to say stiff, manner.

The conveyed object receiver in particular forms a peripheral embracing wall, which laterally embraces the conveyed object in the conveyed object receiver. The wall can be peripherally closed or have interruptions.

In particular, the conveyed object receiver forms a receiving base, on which the conveyed object lies or bears, in particular lies or bears on account of gravitational force. The receiving base can be closed or comprise interruptions.

The conveyed object receiver is designed as a recess for example. The recess can be a trough or be in the manner of a blind hole.

If, with regard to the conveyed object container, it is the case of a piece item container, then the conveyed object receiver in particular is designed as a piece item receiver for receiving at least one piece item. The piece item receiver can completely or partly receive the at least one piece item.

According to a further development of the invention, the piece item receiver is designed for receiving an individual piece item. The piece item receiver, in particular the recess, in particular is designed for the exactly fitting receiving of at least a section of the piece item. The piece item in particular is inserted or pushed into the piece item receiver.

The piece item receiver is designed, for example, such that the piece item inserted into the piece item receiver projects with a section, in particular an end section, out of the piece item receiver. However, the piece item receiver can also completely receive the piece item.

According to a further development of the invention, the piece item container includes a plurality of piece item receivers for receiving a piece item in each case. The piece item receivers in particular are arranged in at least one row. The at least one row of piece item receivers in particular runs along the longitudinal axis of the piece item container if this is designed as a longitudinal body.

The piece item container in particular is not only designed for conveying piece items, but also as a piece item holder, in particular workpiece holder or piece item carrier, in particular workpiece carrier, for machining/processing the piece items at a machining/processing station. Thereby, it is important for the piece items to have a defined, in particle firm hold or seat, in the piece item receiver.

The piece item container with the at least one piece item receiver is therefore in particular designed in a manner such that the piece item in the piece item receiver is aligned or positioned relative to the piece item container in a defined manner.

This has the advantage that the piece items can already be fed to a processing station in the correct position. An additional alignment of the piece items for the purpose of carrying out a processing step is not necessary.

In particular, this is ensured by way of an exactly fitting receiving of the piece items in the piece item receivers.

The piece item container can be designed for example as a receiving block with piece item receivers. The receiving block in particular is designed as one piece. The receiving block in particle is solid. The receiving block can be of plastic.

The conveyed object container can be closable, in particle re-closable, by way of a closure cover (lid). In this case, the securing of the conveyed object in the container against falling out of the conveyed object receiver can be effected by the closure cover. Accordingly, it is only the conveyed object container, but not the conveyed object which needs to be clampingly held on the holding element.

If the conveyed object container includes a closure cover, then this container in particular is designed as a box, a crate, a case, a carton or a shell.

In particular, such a conveyed object container can be designed for order picking articles. On order-picking, in each case a composition of different articles is created in the conveyed object containers, and these articles are provided at different stations along a conveying path and are fed to the conveyed object containers. With the order-picking, it can be the case of customer orders (goods orders) as well as production orders.

The holding member in particular comprises an insertion section, along which the conveyed object container is pushed onto the holding element.

The insertion section in particular runs parallel to the longitudinal axis of the holding member, in the case that this is designed as an elongate body.

The insertion section in particular includes a container rest. The conveyed object container lies on the container rest. In particular, the conveyed object container can be pushed in the insertion direction onto the holding member, in a manner lying on the container rest. The conveyed object container slides on the container rest on insertion.

According to a particular embodiment of the invention, the spring element forms part of the container rest.

The insertion section moreover in particular includes lateral guides. These prevent the lateral deflection of the conveyed object container to be inserted.

In the region of the insertion section, the holding member forms a receiving region for receiving the piece item container as well as the piece items which are conveyed by this.

The holding member in particular has a restraining means that lies opposite the container rest and which prevents a movement of the conveyed object container away from the container rest in a direction perpendicular to the insertion direction. The restraining means can be a stop for example.

According to a further development of the invention, the restraining means is moreover designed so as to secure the piece items conveyed with the piece item container, against falling out of the piece item receivers.

The restraining means in particular can correspond to the counter-element that is described further above.

According to an embodiment variant of the invention, guard elements that confine or shield the facility parts of the chain conveyor which lie below the conveying region, and in particular the conveying chain itself, from the conveying region, are provided between the chain links and the conveyed object containers. The guard elements in particular are of a sheet-like or extensive nature.

The chain conveyor can thus include a modular belt conveyor. The guard elements are formed by the modular belt links. The modular belt links in turn correspond to the chain links of the conveying chain.

The guard elements can moreover also be plate elements. The chain conveyor can thus include a plate conveyor, for example.

The guard elements can form a continuous rest surface along the conveying direction.

Inasmuch as the guard elements are not themselves part of the conveying chain, then these can be fastened to the conveying chain or to its chain links. The fastening can be of a releasable nature. The guard elements can be arranged, for example, between the conveying chain and the holding elements.

The chain links, to which the guard elements are fastened, in particular can be carriages of the type described above.

The holding members can now be fastened, in particular releasably fastened, to the guard elements, such as plate elements or modular belt links.

However, it is also conceivable for the guard elements themselves to form part of the holding elements.

Projecting holding elements, which hold the conveyed object containers on the guard elements, can thus be arranged on the guard elements, at the conveying side. The holding elements can be holding limbs.

The holding elements in particular are clamping elements. The clamping elements in particular can be clamping limbs that project from the guard element and that are for the clamped holding of the conveyed object containers.

In particular, the chain conveyor of the conveying device is designed for the cycled (paced) conveying of the conveyed object containers and accordingly of the conveyed object arranged on the conveyed object containers. The conveying device accordingly also includes a control.

According to a further development of the conveying device, this moreover includes a buffer station. A buffer station is applied if the conveyed object, for example, must run through a recovery phase, in which this e.g. cools down, between two processing stations. A buffer station can also be applied with operating disruptions or interruptions in the manufacturing chain, which render necessary a buffering of the fed conveyed object containers before their continued processing.

The buffer station in particular includes an extensive conveying element, on which conveyed object containers charged with a conveyed article or empty conveyed object containers, and which are pushed out of the holding members, can be buffered. The extensive conveying element can be a conveying belt or a plate conveyor. The conveyed object containers are conveyed on the extensive conveying element, in particular in a non-cycled, i.e. unpaced manner.

The conveyed object containers can be pushed together, in particular pushed onto one another, on the extensive conveying element, for the purpose of buffering.

The conveying device now includes a transfer zone, in which the conveyed object containers are brought from the holding members of the chain conveyor onto the extensive conveying element, such as conveying belt, of the buffer station. For this, a transfer device can be provided in the transfer zone, by way of which device the conveyed object containers to be buffered are transferred, in particular pushed, from the holding member onto the extensive conveying element, such as conveying belt.

In the transfer zone, the chain conveyor and the extensive conveying element of the buffer station in particular can have equally directed conveying directions, which are parallel to one another.

The conveyed object containers are onwardly conveyed on the extensive conveying element, in particular with a lower conveying speed than the conveying speed of the chain conveyor.

The conveyed object containers in particular are pushed from the holding member and transferred to the extensive conveying element of the buffer station, in particular in an oblique manner, i.e. with a lateral movement component and a movement component in the conveying direction.

The transfer device in each case can have moved or stationary guide elements.

The transfer can be effected during the conveying of the holding members or given a standstill of the holding elements.

In the transfer zone, the conveyed object containers in particular are brought from a cycled conveying by the chain conveyor into a non-cycled conveying by the extensive conveying element.

The conveying device moreover includes a take-over zone, in which the conveyed object containers are taken from the conveying elements, out of the buffer station. A take-over device can be provided in the take-over zone for this, by way of which take-over device the conveyed object containers to be buffered are brought, in particular pushed, from the extensive conveying element, such as conveying belt, of the buffer station onto holding members of the chain conveyor.

The take-over device in each case can include moved or stationary guide elements.

The take-over can be effected during the conveying of the holding members or given a standstill of the holding elements.

In the take-over zone, the conveyed object containers can be brought from a non-cycled conveying by the extensive conveying element into cycled conveying by the chain conveyor.

The position and the speed of the conveyed object containers, in particular in the take-over zone are synchronised with the holding members moved cyclically into the take-over zone, by way of the take-over device.

According to a further development of the invention, the conveyed object containers are pushed onto the holding member in an oblique manner, i.e. with a lateral movement component and a movement component in the conveying direction of the conveying element.

In the take-over zone, the conveying direction of the extensive conveying element in particular is parallel to the conveying direction of the holding elements. The conveying direction of the extensive conveying element can be directed equally to the conveying direction of the holding members or can be directed counter to this. The latter direction variant can assist the insertion of the conveyed object containers into the holding elements.

BRIEF DESCRIPTION OF THE DRAWINGS

The subject-matter of the invention is hereinafter explained in more detail by way of embodiment examples which are represented in the accompanying figures. There are schematically shown in each case in.

DETAILED DESCRIPTION OF THE INVENTION

Figure 1A:
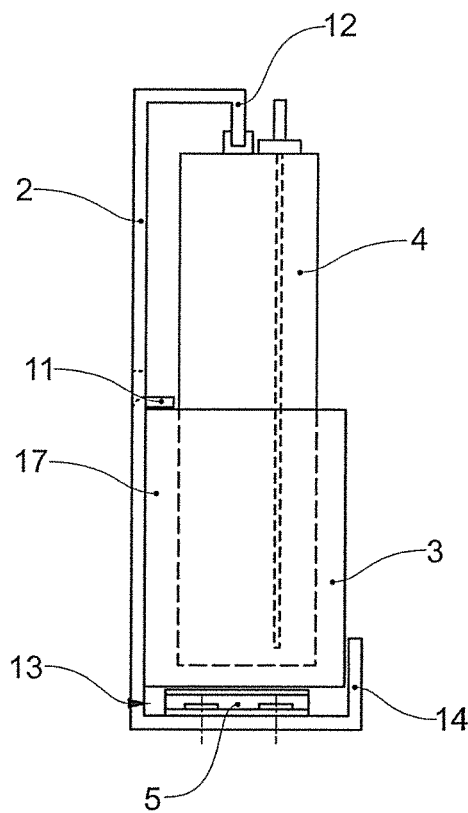
FIG. 1a a front view of a holding member with a piece item container according to a first embodiment.
Figure 1B:
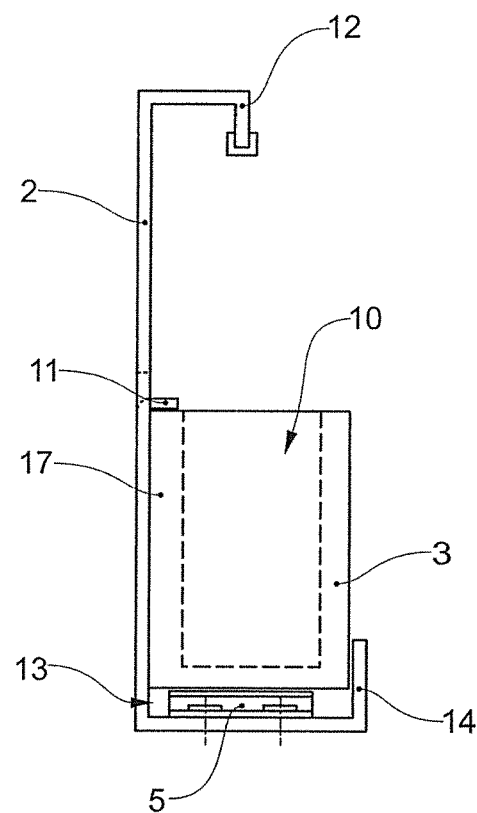
FIG. 1b a front view of the holding member according to FIG. 1a, without piece item containers, FIG. 2 a lateral view of the holding member with piece item containers, according to FIGS. 1a and 1b.
Figure 2:
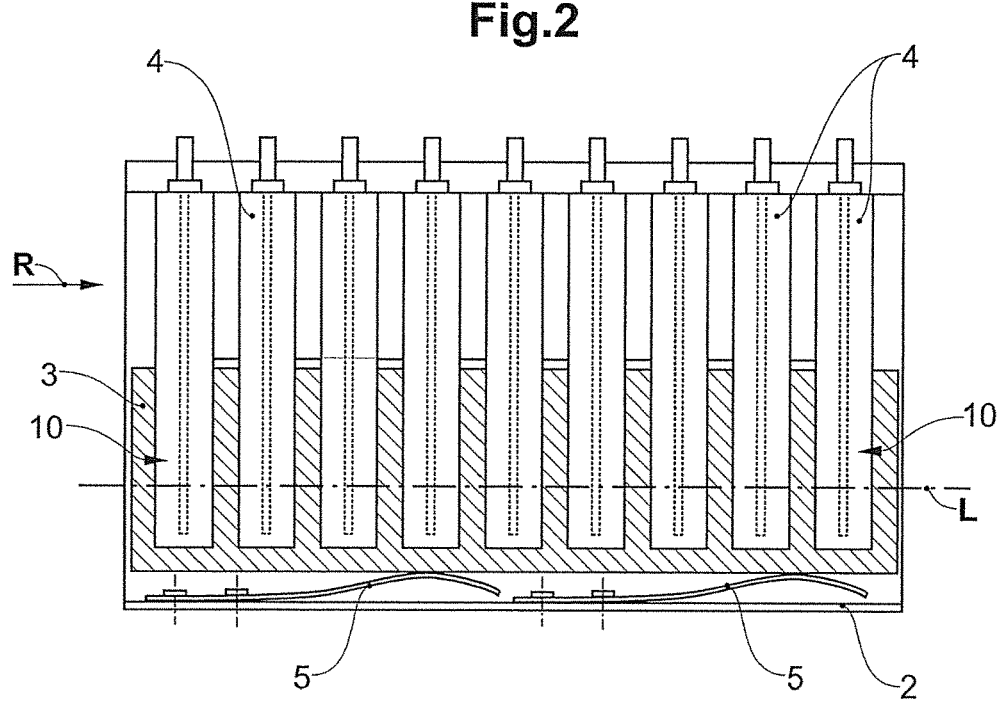
Figure 3:
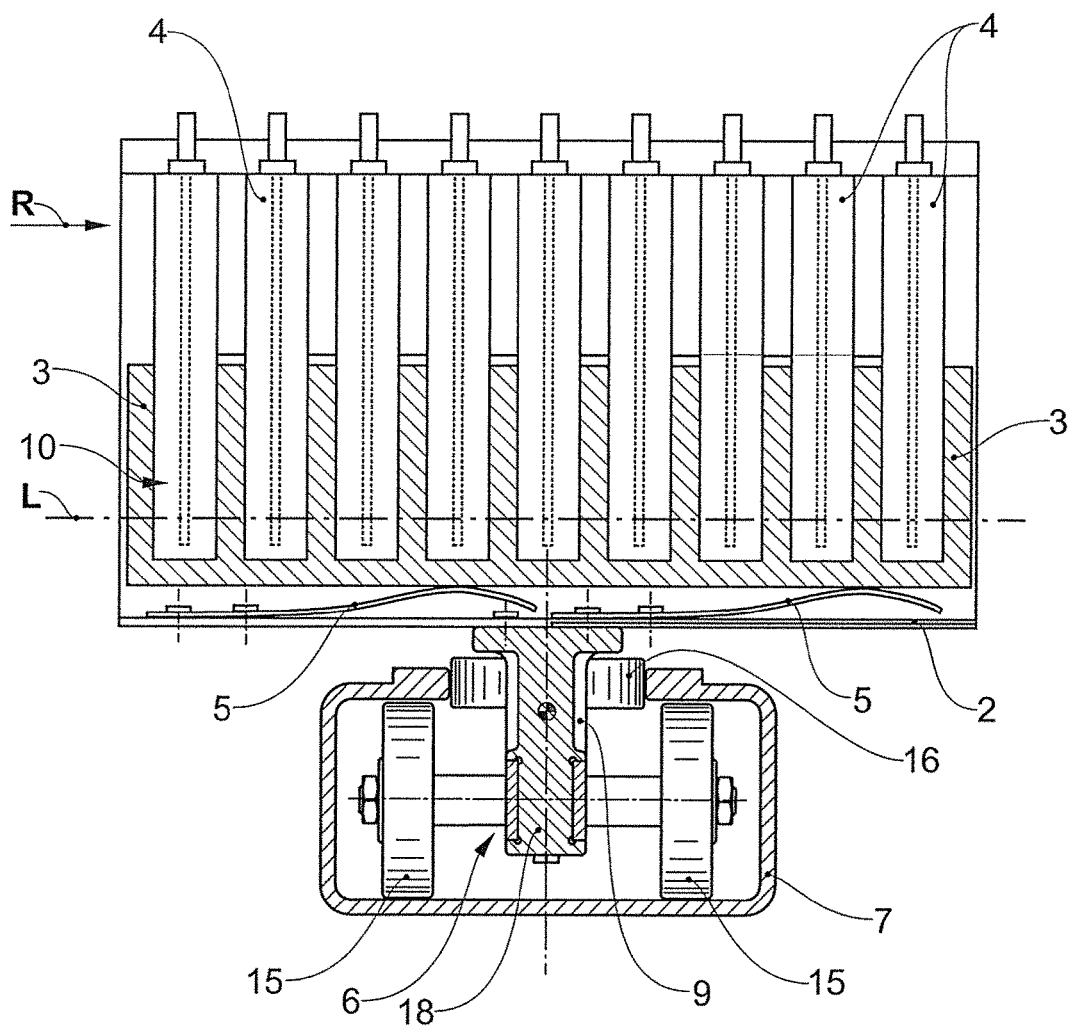
FIG. 3 a view in the conveying direction, of the holding member with piece item containers according to FIGS. 1a, 1b and 2, the holding member being arranged on a carriage.

Basically, in the figures, the same parts are provided with the same reference numerals.

The piece item container 3 according to FIGS. 1a, 1b and 2 to 5 is designed as a longitudinal body with plurality of piece item receivers 10 which are arranged successively in a row along its longitudinal axis L. The piece item receivers 10 are recesses, into which the piece items 4 are brought. The piece item receivers 10 each receive the piece items 4 in an exactly fitting manner, so that the piece items 4 have a defined retention in the piece item receivers 10. The piece items 4 project with an upper end section out of the piece item receivers 10.

According to the present embodiment, the piece items 4 are semi-finished products of gas lighters. The piece item container 3 thereby simultaneously serves as a piece items holder for carrying out processing or machining steps on the gas lighters 4. This, for example, can be the filling of the gas lighter with gas, and/or the assembly of the head with the spark wheel and flint.

The piece item container 3 can be laterally inserted into a holding member 2, for conveying the piece item 4 in the piece item container 3. The holding member 2 is designed as an angular profile. The angular profile forms an insertion section 12 with a container rest and a side guide 14. The side guide 14 comprises lateral profile walls.

In the region of the insertion section 13, the holding member 2 forms a receiving region 17 for receiving the piece item container 3 as well as the lighters 4, which are conveyed by this.

The insertion section 13 moreover includes a profile base that delimits the receiving region 17 towards the conveying chain 20. Two arched spring steel sheet elements 5 are arranged in the receiving region 17, on the profile base. These form a container rest.

The holding member 2 moreover includes a first counter-element 11 in the form of at least one projection projecting into the receiving region 17. The projection is formed by a wall section, which is bent out of the profile wall into the receiving region 17.

The holding member 2 moreover has a second counter-element 12 in the form of a further projection projecting into the receiving region 17. The projection is formed by an end section of the lateral profile wall, which is bent into the receiving region 17.

On inserting the piece item container 3 into the insertion section 13 of the holding member 2, this container is then pushed over the spring steel sheet elements 5, which are concavely ached into the receiving region 17. The spring steels sheet elements 5 are thereby squashed and the curvature flattens. The piece item container 3 is pressed away from the profile base in the direction of the first counter-element 11 and abuts on this, due to the now acting restoring force of the spring steel sheet elements 5. The piece item container 3 is now firmly clamped between the first counter-element 11 and the spring steel sheet element 5 and is secured against release from the holding member 2.

If piece items 4 are arranged on the piece item container 3, then the piece items 4 are pressed by the spring steel sheet elements 5, via the piece item container 3, towards the second counter-element 12 and abut on this, on inserting the piece item container 3 over the spring steel sheet elements 5. The piece items 4 are fixedly clamped in the holding member 2 and are secured against falling out of the piece item receivers 10.

The holding members 2 are each fastened on a chain link 6 of a conveying chain 20. The chain links 6 are designed as carriages 56, which are connected to one another via joint connections, into the conveying chain 20.

The carriages each include a main body 9. The main body 9 has coupling elements 8 for forming the joint connection (see FIG. 4).

The main body 9 moreover includes a connection interface 18 for creating a connection to the holding member 2. The holding members 2 are thus each fastened to the main body 9 of the carriage 6 via the connection interface 18.

The carriage 6 has two rollers 15, via which the carriage 6 rolls along a runner rail 7. The carriage 6 moreover also has a guide roller 16, via which the carriage 6 is led along the runner rail 7.

Figure 4:
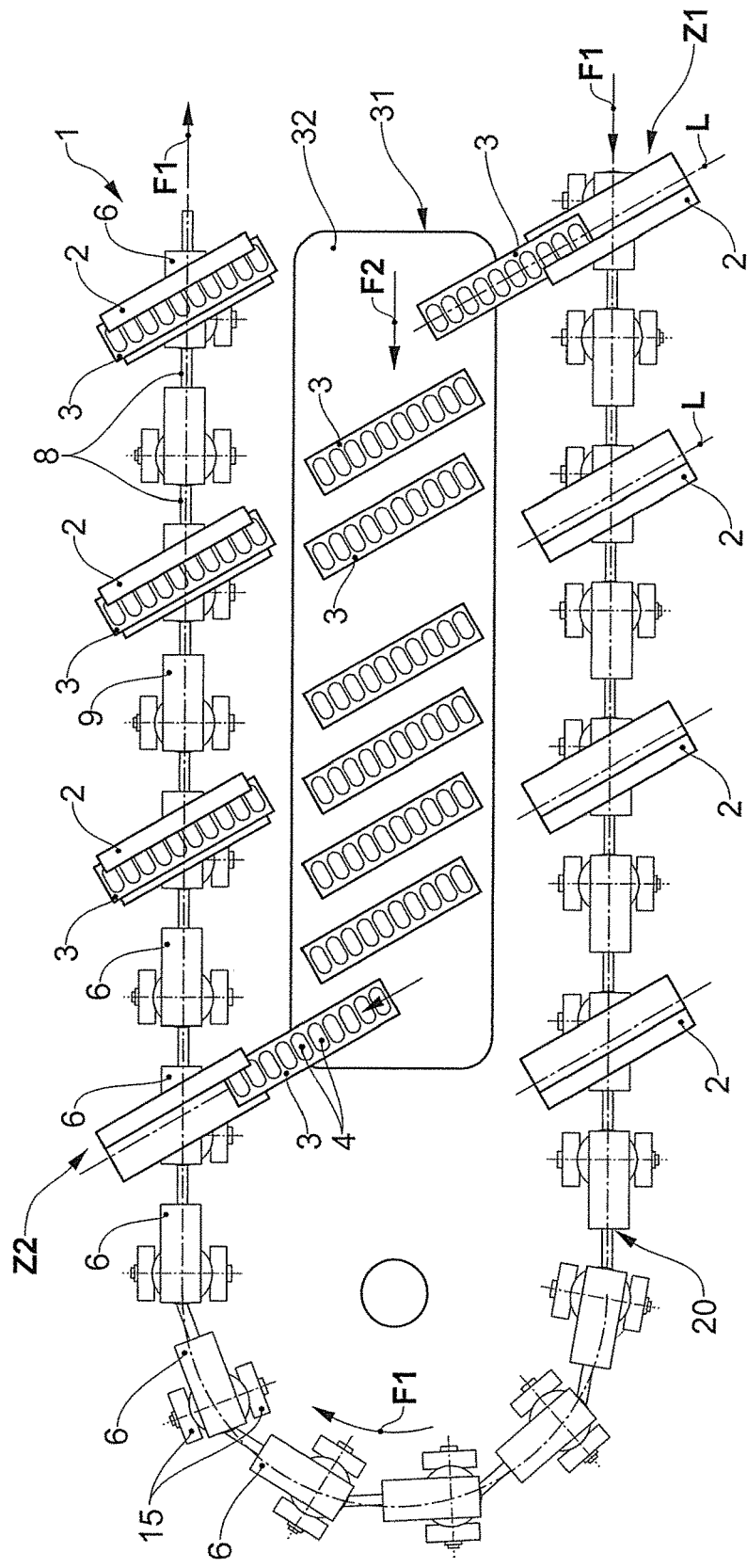
FIG. 4 a plan view of a first embodiment of a conveying device with a buffer station, according to the invention.

The holding members 2 and with them, the piece item containers 3 that are arranged on them, are arranged obliquely, i.e. at an angle of greater than 0°, with respect to the conveying direction F1 (see FIG. 4).

The piece item containers 3, which are held by the holding members 2, are now conveyed with the piece items 4 between the individual processing stations by way of the driven conveying chain. Since the piece item containers 3 as well as the piece items 4 themselves are fixedly clamped in the holding member 2 and thus secured against falling out, these can be conveyed along complex conveying paths in three-dimensional space. The conveying path can thus include steep ascents and descents, as well as spiral-like curved paths. An upside-down conveying is possible.

The conveying device according to the embodiment according to FIG. 4 now, apart from the chain conveyor described above, further comprises a buffer station 31. A central element of the buffer station 31 is formed by a conveying belt 32, on which the piece item containers 3 with the piece items 4 can be buffered when required.

The buffer station 31 with the chain conveyor forms a transfer zone Z1, in which the piece item containers 3, which are conveyed in the conveying direction F1, can be pushed from the holding member 2 onto the conveying belt 32 of the buffer station 21. In the transfer zone Z1, the conveying direction F2 of the conveying belt 32 runs parallel to the conveying direction F1 of the chain conveyor. However, the conveying speed of the conveying belt 32 is lower than the conveying speed of the chain conveyor.

A transfer device, by way of which the piece item containers 3 are pushed from the holding member 2 onto the conveying belt 32, can be provided in the transfer zone Z1 (not shown).

Downstream, the buffer station 31 with the chain conveyor moreover forms a take-over zone Z2, in which the piece item containers 3 with the piece items 4 and which are conveyed in the conveying direction F2 are pushed from the conveying belt 32 of the buffer station 31 onto the holding members 2.

In the region of the take-over zone Z2, the buffer station 31 includes a constraint that prevents the piece item containers 3 from falling down from the conveying belt 32 (not shown).

Since the conveying direction F1 of the chain conveyor is changed in a deflection by 180°, the conveying direction F2 of the conveying belt 32 and the conveying direction F1 of the chain conveyor now run counter to one another, but parallel to one another, in the take-over zone Z2. The conveying directions F1, F2, which are opposite to one another now, assist the procedure of the pushing of the piece item containers 3 from the conveying belt 32 onto the holding member 2.

A take-over device can be provided in the take-over zone Z2, by way of which take-over device the piece item containers 3 are pushed from the conveying belt 32 onto the holding member 2 (not shown).

Figure 5:
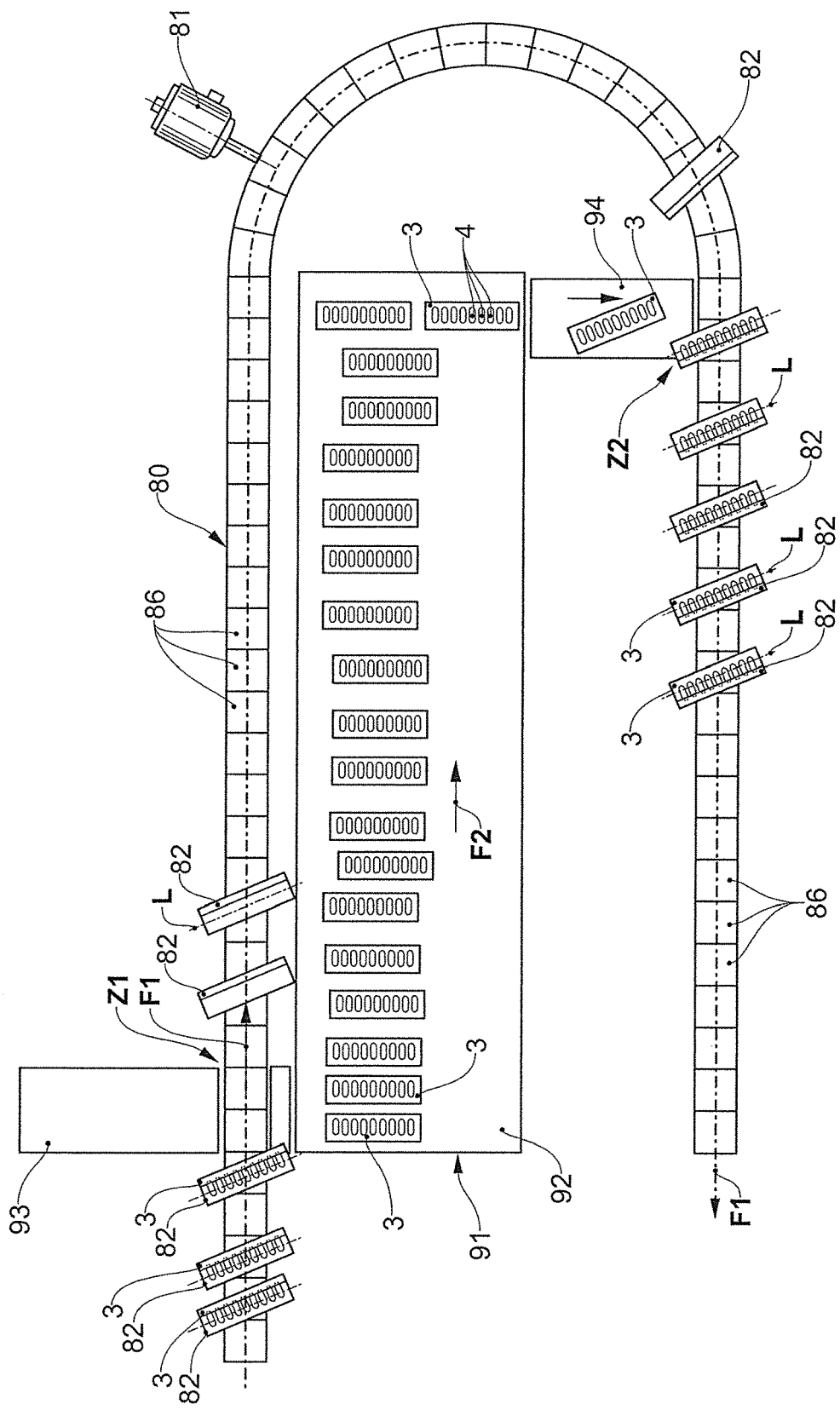
FIG. 5 a plan view of a second embodiment of a conveying device with a buffer station, according to the invention.

The conveying device according to the embodiment example according to FIG. 5 includes a chain conveyor 80 as well as a buffer station 91. The chain conveyor 80 with regard to its basic construction corresponds to a plate conveyor and includes conveying plates 86, which are fastened in each case to a conveying chain, which is to say to its chain links (not shown). The conveying chain is formed from carriages that are articulately connected to one another (not shown).

Holding members 82, as have already been described further above, are attached on the conveying plates 86. The present holding members 82 differ from the holding members, which are described in detail above, merely in the type of fastening on the conveying plates 86.

The holding members 82 receive piece item containers 3. The piece item containers 3 correspond to the piece item containers already described further above. They include piece item receivers for receiving individual piece items 4 in each case.

The holding members 82 and the piece item containers 3 are designed as longitudinal bodies. With their longitudinal axis L, they are arranged on the conveying plates 86 in an oblique manner with respect to the conveying direction F1 of the chain conveyor 80. The longitudinal axis thus encloses an acute angle with the conveying direction F1.

The buffer station 91 includes a conveying belt 92, on which the piece item containers 3 with the piece items 4 can be buffered when required.

The buffer station 91 now with the chain conveyor 80 forms a transfer zone Z1, in which the piece item containers 3 conveyed in the conveying direction F1 are pushed from the holding member 82 onto the conveying belt 92 of the buffer station 91. In the transfer zone Z1, the conveying direction F2 of the conveying belt 92 runs parallel to the conveying direction F1 of the chain conveyor 80. However, the conveying speed of the conveying belt 92 is lower than the conveying speed of the chain conveyor 80.

A transfer device 93, by way of which the piece item containers 3 are pushed from the holding members 82 onto the conveying belt 92 is provided in the transfer zone Z1.

Downstream, the buffer station 91 with the chain conveyor 80 moreover forms a take-over zone Z2, in which the piece item containers 3, which are conveyed in the conveying direction F2, are pushed from the conveying belt 92 of the buffer station 91 onto the holding members 82.

A take-over device 94, by way of which the piece item containers 3 are pushed from the conveying belt 92 onto the holding members 82 is provided in the take-over zone Z2.

The buffer station 91 in the region of the take-over zone Z2 includes a constraint, which prevent the piece item containers 3 from falling down from the conveying belt 92 (not shown).

Figure 6:
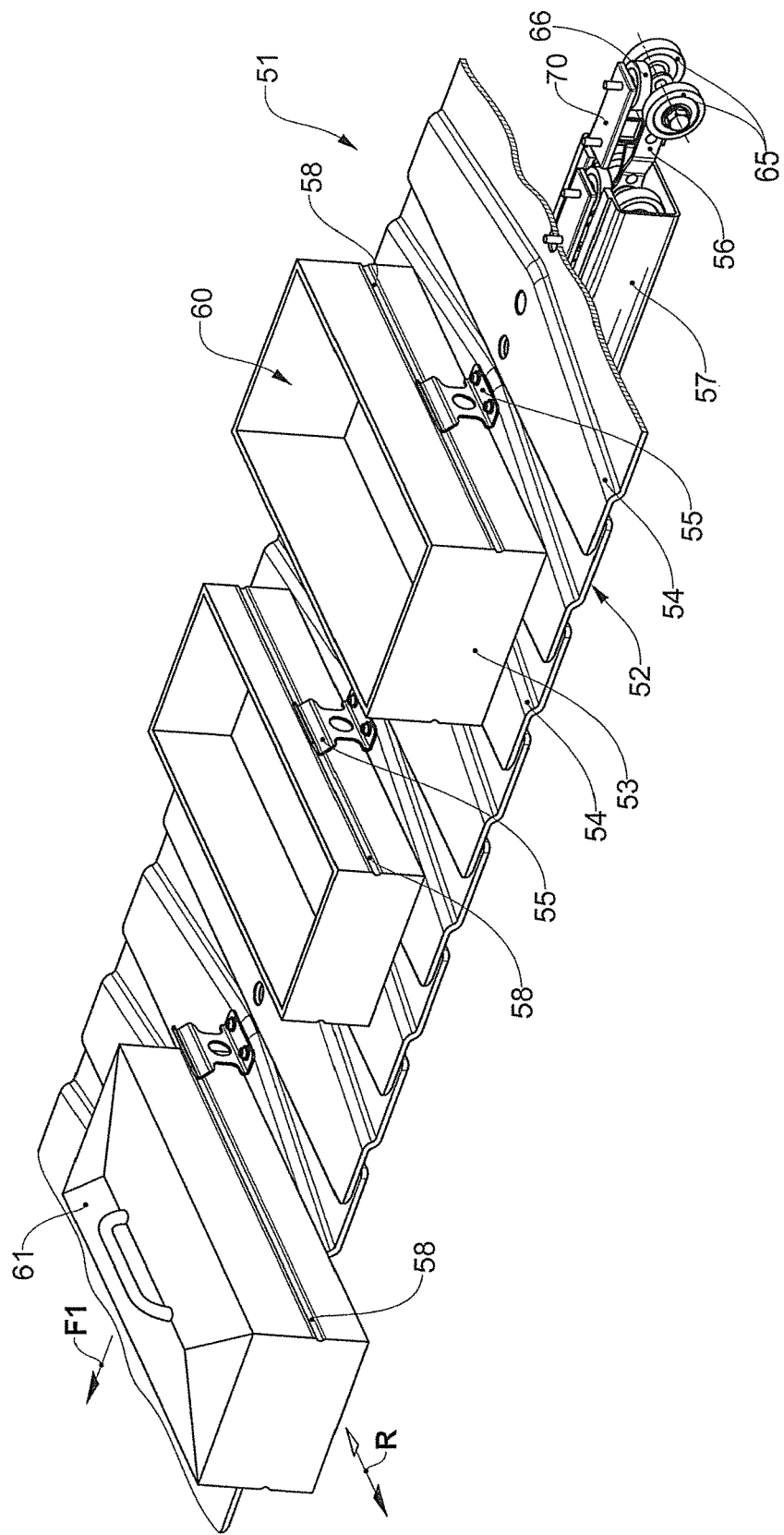
FIG. 6 a perspective view of a further embodiment of a conveying device with holding members according to the invention.

The conveying device 51 according to the embodiment example according to FIG. 6 includes a plate conveyor. The plate conveyor has conveying plates 54 that are fastened on a conveying chain 70 in each case.

The conveying chain 70 is again formed from carriages 56 that are articulately connected to one another. The carriages 56 are guided in a runner rail 57, which sets the conveying path. The conveying plates 54 are accordingly fastened on the carriages 56.

In contrast to the embodiment example according to FIG. 5, here the conveying plates 54 form a part of the holding members 52. Holding limbs 55 projecting from the conveying plates 54 are arranged on these plates. The holding limbs 55 are designed in a compliant manner.

The holding limbs 55 are part of the holding member 52 and include holding sections, via which the piece item containers 53 are held on the conveying plates 54 in each case by the holding limbs 55.

The holding limbs 55 are arranged on the conveying plates 54 in each case in pairs, with holding sections which face one another. They delimit a receiving region for receiving the piece item containers 53. The holding limbs 55 for this are arranged successively in a row along the conveying direction F1.

The piece item containers 53 are designed as crates with a conveyed object receiver 60 for receiving the conveyed object. The piece item containers 53 can be closed with a closure cover 61.

The piece item containers 53 include insert grooves 58, which are arranged laterally and run in the insertion direction R. The holding limbs 55 engage into the insert grooves 58 when pushing the piece item container 53 onto the holding member 52. The insert grooves 58 thus form a lateral insertion guide.

The invention claimed is:

1. A conveying device comprising a chain conveyor with a conveying chain and a plurality of conveyed object containers, which are attached on the conveying chain and which are adapted to receive a conveyed object, wherein each of the conveyed object containers are fastened to the conveying chain via a holding member that is directly or indirectly connected to the conveying chain, wherein in a conveying section the conveying chain is arranged below the holding member, and wherein the holding member comprises an insertion section along which the conveyed object container can be pushed onto the holding member and which is adapted for inserting the object container in an insertion direction that lies in a same plane as the conveying direction, and wherein the holding member contains at least one clamping element and is adapted to hold the conveyed object container in a clamping manner.

2. The conveying device according to claim 1, wherein, for holding, the conveyed object container is pushed in the insertion direction onto or into the holding member.

3. The conveying device according to claim 1, wherein the holding member is releasably fastened to the conveying chain in a direct or indirect manner.

4. The conveying device according to claim 1, wherein the at least one clamping element directly or indirectly fixedly clamp the conveyed object container on the holding member.

5. The conveying device according to claim 4, wherein the at least one clamping element exerts a clamping force upon the conveyed object container in a direct or indirect manner.

6. The conveying device according to claim 4, wherein the holding member contains a counter-element that is designed to secure the conveyed objects conveyed by the conveyed object container, against falling out of the at least one conveyed object container.

7. The conveying device according to claim 4, wherein the clamping force that acts upon the conveyed object container is directed perpendicularly to the insertion direction of the conveyed object container.

8. The conveying device according to claim 1, wherein the conveyed object container is a longitudinal body, and the conveyed object container is arranged on the holding member such that a longitudinal axis of the longitudinal body runs parallel to the insertion direction.

9. The conveying device according to claim 1, wherein the conveyed object container comprises at least one conveyed object receiver for receiving a conveyed object.

10. The conveying device according to claim 1, wherein the holding member forms a container rest, on which the conveyed object container lies.

11. The conveying device according to claim 10, wherein the holding member contains a counter-element, which lies opposite the container rest, and thus prevents a movement of the conveyed object container away from the container rest in a direction perpendicular to the insertion direction.

12. The conveying device according to claim 1, wherein a guard element is arranged between the conveyed object containers and the conveying chain.

13. The conveying device according to claim 12, wherein the at least one guard element is arranged between the holding members and the conveying chain, or that the at least one guard element is part of the holding members.

14. The conveying device according to claim 1, wherein the holding member and its arrangement on the conveying chain are such that the insertion direction forms an angle of greater than 0° to the conveying direction of the holding member.

15. The conveying device according to claim 1, further comprising a buffer station with an extensive conveying element for buffering conveyed object containers, which are pushed out of the holding member.

16. A method for buffering conveyed object containers with a conveying device according to claim 15, wherein the conveying device forms a transfer zone, in which the conveyed object containers are pushed from the holding members and are transferred onto the extensive conveying element of the buffer station, and a take-over zone, in which the conveyed object containers are pushed from the conveying element onto the holding members.

17. The method according to claim 16, wherein the conveyed object containers in the transfer zone are brought from a cycled conveying by the chain conveyor into a non-cycled conveying by the extensive conveying element, and the conveyed object containers in the take-over zone are brought from an non-cycled conveying by the extensive conveying element into a cycled conveying by the chain conveyor.

18. The method according to claim 17, wherein the position and the speed of the conveyed object containers in the take-over zone are synchronized with the holding members of the chain conveyor which are cyclically moved into the take-over zone, by way of the take-over device.

19. The method according to claim 16, wherein the conveying direction of the extensive conveying element in the take-over zone is parallel to the conveying direction of the holding members of the chain conveyor.

\* \* \* \* \*